(12) United States Patent
Tran

(10) Patent No.: US 8,150,618 B2
(45) Date of Patent: Apr. 3, 2012

(54) METHOD AND APPARATUS TO SELECT CITY NAME ASSOCIATED WITH STREET LOCATED ON BORDER OF TWO CITIES

(75) Inventor: Thai Tran, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 750 days.

(21) Appl. No.: 12/286,197

(22) Filed: Sep. 29, 2008

(65) Prior Publication Data

US 2010/0082243 A1 Apr. 1, 2010

(51) Int. Cl.
*G01C 21/30* (2006.01)
*G01C 21/32* (2006.01)
(52) U.S. Cl. ........................................ 701/208
(58) Field of Classification Search .......... 340/990, 340/995.1, 995.11, 995.12, 995.14, 995.17; 701/25, 200–202, 206–209, 213, 214, 216; 715/856–858, 780
See application file for complete search history.

(56) References Cited

U.S. PATENT DOCUMENTS

| 6,112,153 | A | * | 8/2000 | Schaaf et al. | 701/200 |
| 6,587,787 | B1 | * | 7/2003 | Yokota | 701/212 |
| 2005/0261822 | A1 | * | 11/2005 | Wako | 701/200 |

FOREIGN PATENT DOCUMENTS

JP 6-250586 9/1994

* cited by examiner

*Primary Examiner* — Khoi Tran
*Assistant Examiner* — Harry Oh
(74) *Attorney, Agent, or Firm* — Muramatsu & Associates

(57) ABSTRACT

A method and apparatus for identifying correct city involving a street that borders on two or more cities for a navigation system. The navigation system identifies a correct city name associated with such a border street based on a direction of a vehicle travelling on the border street. In another aspect, the navigation system identifies a correct city name associated with such a border street based on a cursor point on the map image as to which side of the street and city is more proximate to the cursor point. Further, the navigation system identifies a correct city name associated with such a border street based on an address number as to whether it is an odd number or even number thereby determining the side of the street and city.

20 Claims, 13 Drawing Sheets

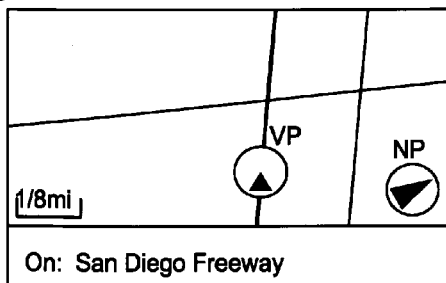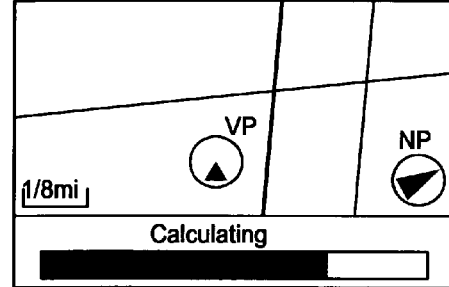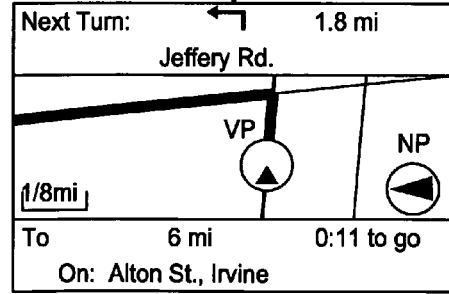

Fig. 4A

Input Address Number

8035_     LAMPSON

| N | 7 | 8 | 9 | E |
| S | 4 | 5 | 6 | W |
| Any | 1 | 2 | 3 | - |
| | 0 | OK | | |

Fig. 4B

Select City Name

1 Garden Grove
2 Stanton

Fig. 8A

Input Address Number

8035_ — 53        51 — LAMPSON

55 →

| N | 7 | 8 | 9 | E |
| S | 4 | 5 | 6 | W |
| Any | 1 | 2 | 3 | - |
|  | 0 | OK | | |

Fig. 8B

Select City Name

1  Garden Grove
2

Input Address Number

8036_  LAMPSON

| N | 7 | 8 | 9 | E |
| S | 4 | 5 | 6 | W |
| Any | 1 | 2 | 3 | - |
| | 0 | OK | | |

Fig. 8D

Select City Name

1 Stanton

2

METHOD AND APPARATUS TO SELECT CITY NAME ASSOCIATED WITH STREET LOCATED ON BORDER OF TWO CITIES

FIELD OF THE INVENTION

This invention relates generally to a method and apparatus for identifying a correct city name for a navigation system, and more particularly, to a method and apparatus for a navigation system for identifying a correct city name associated with a particular street that runs on a border of two cities depending on various factors including directions of travel.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a DVD (digital versatile disc), or a hard disc. Typically, the navigation system displays a map image on a monitor screen while superimposing thereon a mark representing the current location of the user's vehicle.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

When a user selects to set a destination, the navigation system displays a "Find Destination by" screen as shown in FIG. 1B for specifying an input method for selecting the destination. When selecting, the "Point of Interest" method in FIG. 1B, the navigation system displays selection methods of point of interest (POI) either by "Place Name" or "Place Type" in FIG. 1C. If the "Place Type" is selected, the navigation system lists categories of POIs as shown in FIG. 1D.

FIG. 1E shows a screen when the user has selected a "Restaurant" category in FIG. 1D, which includes a list of names of POI type "Restaurant" typically sorted by distance from the current position. The user selects a desired destination, as shown in FIG. 1F and presses an "OK to Proceed" button for the navigation system to calculate an appropriate route to the destination. FIG. 1G shows an example of screen when the navigation system calculates and determines the route to the destination. After determining the route, the navigation system starts the route guidance to the destination as shown in FIG. 1H.

In the operation of the navigation system noted above, typically, a street on which the user's vehicle is running is illustrated with its address. In some geographic areas, a street may run on the boundary (border) line between two or more cities. FIG. 2A is a schematic diagram showing such a situation where a street "Lampson Avenue" is running on a border line between the city of "Stanton" and the city of "Garden Grove". As shown, the city of "Stanton" is at the north of the street "Lampson Avenue" while the city of "Garden Grove" is at the south.

FIG. 2B shows a typical representation on a screen of the navigation system showing the geographical situation in FIG. 2A. Unless the street is a freeway or its equivalent, a street is usually represented as a single line on the navigation screen. Problems may arise for a street that divides two or more cities as in the example described above under the conventional navigation system.

An example of such problems is a failure to correctly identify a city name based on a street lane on which a vehicle is travelling, i.e., a direction of vehicle. In the example shown in FIG. 2A, the south side of the street is the city of "Garden Grove" and the north side is the city of "Stanton". Thus, for the vehicle 21 that heads to the east, the street "Lampson Avenue" would be associated with the city of "Stanton" since the vehicle 21 is on the north side of the street under the U.S. traffic regulation. Likewise, for the vehicle 23 that heads to the west, the "Lampson Avenue" would be accompanied by the city of "Garden Grove".

However, without regard to the direction of travel described above, the conventional navigation system will show one arbitrary city name. In FIG. 2B, even though the vehicle (VP) is heading to the east, a street name window 35 in the map view includes the city name "Garden Grove" rather than "Stanton". Namely, the navigation system displays the address of the street without taking the direction of the vehicle into consideration.

Another problem is a failure to correctly identify a city name when a street on a map image on the navigation screen is specified when such a street is on the border of two or more cities. FIGS. 3A and 3B show an example of such a situation where the navigation screen shows a street image that divides two cities and two cursor points. This example depicts the situation similar to that of FIGS. 2A and 2B where the street "Lampson Avenue" is on the border line between the city of "Stanton" in the north and the city of "Garden Grove" in the south.

In FIG. 3A, when a cursor on the navigation screen is located at a point 41 that is a northern portion of the street "Lampson Avenue", the city of "Stanton" would be an appropriate city name. Likewise, in FIG. 3A, for a cursor point 43 that is on a southern portion of the street "Lampson Avenue", the city of "Garden Grove" would be an appropriate name. However, as shown in FIG. 3B, instead of showing the correct city name, the conventional navigation system will return one city name (either "Stanton" or "Garden Grove") regardless of the exact location of the cursor point. Thus, in FIG. 3B, even when the cursor is on the point 41, incorrect information is displayed on an address window 45 that includes the city name "Garden Grove" rather than "Stanton".

Still another problem may arise during a process of finding an address when a particular street is running on a border between two or more cities. FIG. 4A is an example of navigation screen that prompts the user to input an address number (house number) of a desired location. At this stage, the user has already specified the street name of "Lampson" and the address number "8035", which is an odd number, in an address input field 53 through a keypad 55 on the navigation screen.

In FIG. 4B, based on the street name and address number, the navigation system displays a list of city names in which the candidate location would be found. In this example, although the city names "Garden Grove" and "Stanton" are listed on the screen, there should be only one city that satisfies the input of "8035 Lampson". Thus, only the city of "Stanton" should be listed supposing that the odd address numbers are assigned to the north side of the street "Lampson Ave".

Thus, there is a need of a new method and apparatus for a navigation system that is capable of identifying a correct city name associated with a particular street depending on various factors including directions of travel, cursor points, address numbers, etc.

SUMMARY OF THE INVENTION

It is, therefore, an object of the present invention to provide a method and apparatus for a navigation system which is capable of identifying a correct city name based on various determination factors when a particular street is located on a border of two or more cities.

It is another object of the present invention to provide a method and apparatus for a navigation system which is capable of identifying a correct city name associated with a particular street that is running on a border of two or more cities based on a direction of a vehicle travelling on the border street.

It is a further object of the present invention to provide a method and apparatus for a navigation system which is capable of identifying a correct city name associated with a particular street that is running on a border of two or more cities based on a cursor point on the map image as to which side of the street is more proximate to the cursor point.

It is a further object of the present invention to provide a method and apparatus for a navigation system which is capable of identifying a correct city name associated with a particular street that is running on a border of two or more cities based on an address number specified by the user as to whether the address number is an odd number or even number thereby determining the side of the street.

One aspect of the present invention is a method for a navigation system to determine a city name when a particular street is located on a border of two or more cities. The method includes the steps of: determining whether a particular street (hereafter "border street") specified by a user is located on a border between two or more cities; selecting and applying a determination factor appropriate to a current situation associated with the border street; determining and selecting a city name associated with the border street appropriate to the current situation; and displaying the selected city name as a part of address information associated with the border street on a screen of the navigation system; where the city represents any administrative region including town, county and state.

In the method of the present invention, the step of determining and selecting the city name includes a step of selecting the city name that is located at a side of the border street by applying the determination factor. Further, the step of determining whether the specified street is located on the border includes a step of evaluating map data stored in the data storage medium of the navigation system and retrieving information related to the border street and names of two or more associated cities.

In the method of the present invention, the border street is specified by the user when a vehicle of the user is travelling on the border street which is detected by the navigation system based on GPS signals. In another aspect, the border street is specified by the user when the user operates a cursor on a map image on the screen of the navigation system where the cursor on the map image points the border street. In a further aspect, the border street is specified by the user when the user operates an address input screen of the navigation system where the user inputs a name of the border street.

In the method of the present invention, the determination factor is a travelling direction of the vehicle that runs on the border street to determine the side of the border street on which the vehicle is traveling. In another aspect, the determination factor is an exact location of the cursor point on the map image to determine the side of the border street at which the cursor point is located. In a further aspect, the determination factor is an address number corresponding to the cursor point on the map image to determine the side of the border street at which the cursor point is located. In a further aspect, the determination factor is an address number specified by the user as to whether it is an odd number or an even number to determine the side of the border street at which the address number is located.

Another aspect of the present invention is an apparatus for a navigation system to determine a correct city name when a particular street is located on a border of two or more cities by implementing the various steps of the method described above. The apparatus of the present invention enables to identify a correct city name associated with a particular street that is running on the border of two or more cities based on various determination factors.

According to the present invention, the navigation system enables to identify a correct city name based on various determination factors when a particular street is located on a border of two or more cities. The method and apparatus of the present invention is able to identify a correct city name associated with such a border street based on a direction of vehicle travelling on the border street. The method and apparatus of the present invention is able to identify a correct city name associated with such a border street based on a cursor point on the map image as to which side of the street is more proximate to the cursor point. The method and apparatus of the present invention is able to identify a correct city name associated with such a border street based on an address number specified by the user as to whether the address number is an odd number or even number thereby determining the side of the street. As a consequence, the user is able to see a more appropriate city name when the user is driving on the border street, pointing a cursor on the border street, or inputting address data associated with the border street through the navigation screen, etc.

BRIEF DESCRIPTION OF THE DRAWINGS

FIGS. 1A-1H are schematic diagrams showing an example of operational process and screen display involved in the navigation system for selecting a destination and travelling to the destination under the route guidance.

FIG. 2A shows vehicles and driving directions on the border street, and FIG. 2B is an example of schematic representation on the navigation screen for the situation shown in FIG. 2A.

FIG. 3A shows cursor points on a map image of the border street on the navigation screen, and FIG. 3B is an example of schematic representation on the navigation screen for the situation shown in FIG. 3A.

FIGS. 4A and 4B are schematic diagrams for explaining a further problem associated with the conventional navigation system when a street is on a border of adjacent cities where FIG. 4A shows an example of navigation screen for selecting an address, and FIG. 4B is an example of the navigation screen listing the city names associated with the situation of FIG. 4A.

FIG. 6B shows an example of method for determining a traveling direction of the vehicle based on an order of passing the reference points.

FIG. 7A shows the map data associated with the cursor points on the street, and FIG. 7B is an example of schematic representation on the navigation screen when the cursor point is at the north side of the street, and FIG. 7C is an example of schematic representation on the navigation screen when the cursor point is at the south side of the street.

FIGS. 8A-8D are schematic diagrams for correctly determining a city name appropriate to the address number in the present invention when the street is on a border of adjacent cities where FIG. 8A shows a navigation screen for specifying an address when an odd address number is selected, and FIG. 8B is a navigation screen with the city name associated with the situation of FIG. 8A, FIG. 8C shows a navigation screen for specifying an address when an even address number is selected, and FIG. 8D is a navigation screen with the city name associated with the situation of FIG. 8C.

DETAILED DESCRIPTION OF THE PREFERRED EMBODIMENT

The method and apparatus for determining a correct city name based on a particular situation or a factor with respect to a border street is described with reference to the accompanied drawings. When displaying a particular street that runs on a border of two or more cities, the present invention determines as to which city name should be displayed based on various judgement factors. As a result, the selected city name will be displayed on the navigation screen as a part of the address of the street, cursor point, or a list of city names.

It should be noted that although the present invention is described for the case of cities that are bordered by a particular street, the present invention can also be advantageously applicable to any administrative regions, such as towns, cities, counties, states, etc. Thus, when a particular street is located on the border of two or more administrative regions, the method and apparatus of the present invention is able to determine an appropriate name of the administrative region under the situation.

An example of such a judgement factor is a direction of the vehicle that runs on the border between the two or more cities which determines the side of the street on which the vehicle is traveling. Another example of the judgement factor is an exact location of the cursor point on the map image as to which side of the street is closer to the cursor point. A further example of the judgement factor is an address number of the street as to whether the address number is an odd number or an even number which determines the side of the street.

Figure 5:
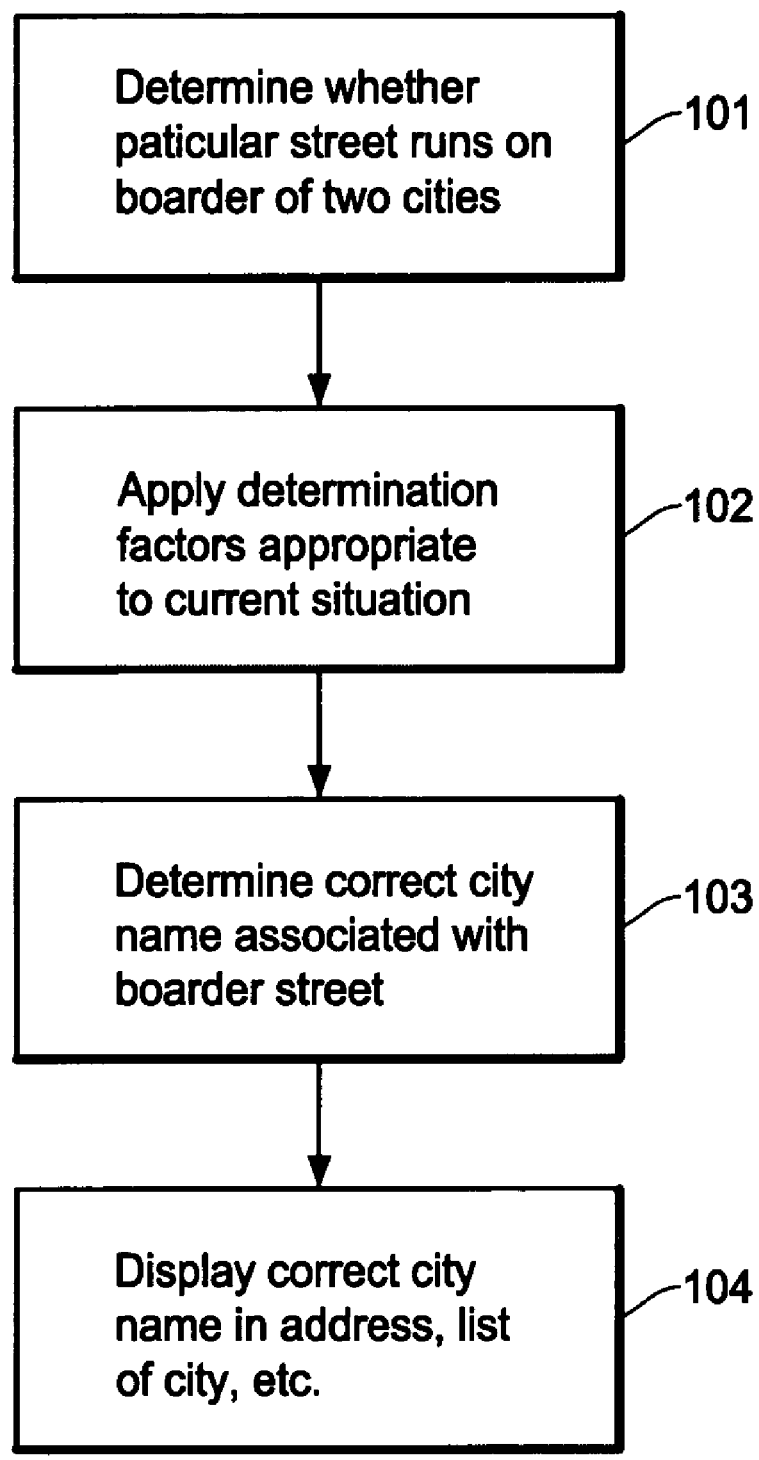
FIG. 5 is a flowchart showing an example of basic operational process for determining a correct city name in accordance with the present invention.

FIG. 5 is a flow chart showing the basic steps of operation for determining the correct city identification for a border street in the present invention. In the first step 101, the navigation system determines whether a particular street (hereafter may also be referred to as "border street") is on a border between two or more cities, towns, states, etc. Such a border street is a street on which the vehicle is currently running that is typically detected by the navigation system based on GPS signals, a street that is pointed by cursor on the map image on the navigation screen, or a street that is specified by the user on the address input screen of the navigation system.

The navigation system determines whether a particular street is a border (boundary) street by typically examining the map data associated with the street. A street link in the map data may have two or more associated city names, for example, a street link of "Lampson Avenue" in the map data include cites of "Stanton" and "Garden Grove" (FIGS. 2A-4B), information on absolute positions on links and road segments of the border street, size, number lanes, etc. The map data may also include information on two or more towns, counties, states, etc., i.e., other types of administrative regions associated with the border. The navigation system evaluates such map data and retrieves the necessary information for the process for determining the correct name under the present invention.

In the next step 102, the navigation system selects and applies the determination factor appropriate to the current situation, such as a current vehicle position and travel direction, a user's operation for pointing a cursor on the map image or inputting an address data, etc. As noted above, an example of judgement factor is a direction of the vehicle that runs on the border street to determine the side of the border street on which the vehicle is traveling. Another example of the judgement factor is an exact location of the cursor point as to which side of the border street is closer to the cursor point. A further example of the judgement factor is an address number on the street as to whether it is an odd number or an even number which determines the side of the border street.

By applying the determination factor, the navigation system determines or selects a correct city name associated with the border street in the step 103. Typically, it is determined as to which side of the border street the user's vehicle is located, the cursor point is located, or the address number is assigned. The city name at the same side of the border street that has been determined by this step will be treated as a correct city name. Namely, the navigation system selects the name of the city that is located at the side which is identical to the side of the border street determined in the above. As a result, in the step 104, the navigation system will display the selected city name on the navigation screen as a part of the address of the street, cursor point, or a list of city names.

Figure 2A:
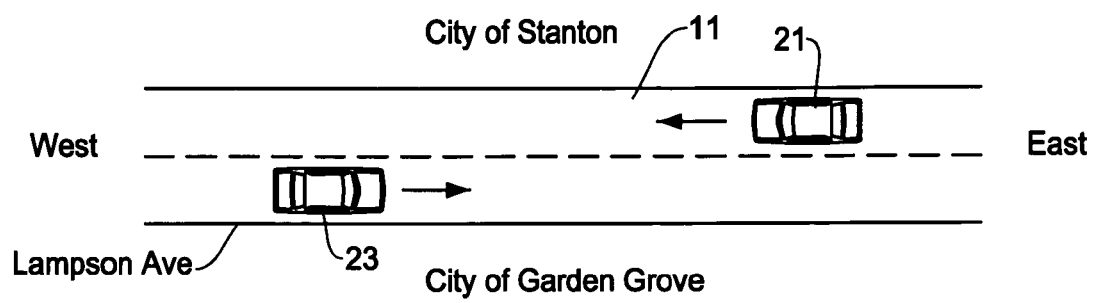
FIGS. 2A and 2B are schematic diagrams for explaining a problem associated with the conventional navigation system when a street is on a border of adjacent cities where
Figure 2B:
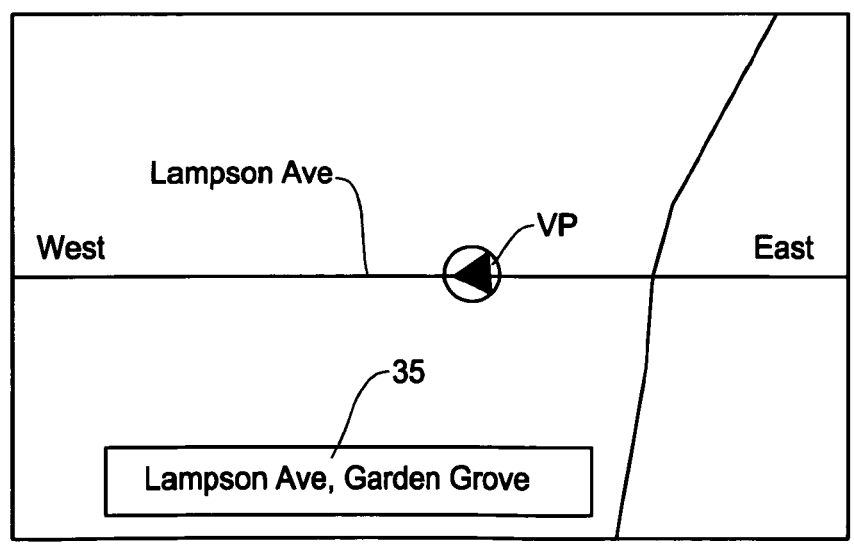
Figure 6A:
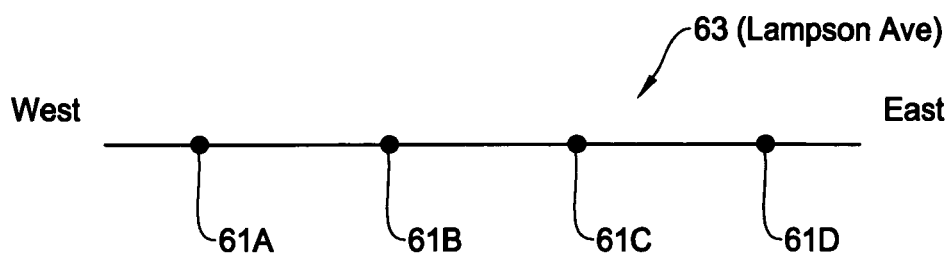
FIGS. 6A and 6B are schematic diagrams for explaining basic concept of the present invention for determining a correct city name based on the traveling direction of the vehicle where FIG. 6A schematically shows a plurality of reference points associated with the street.
Figure 6B:
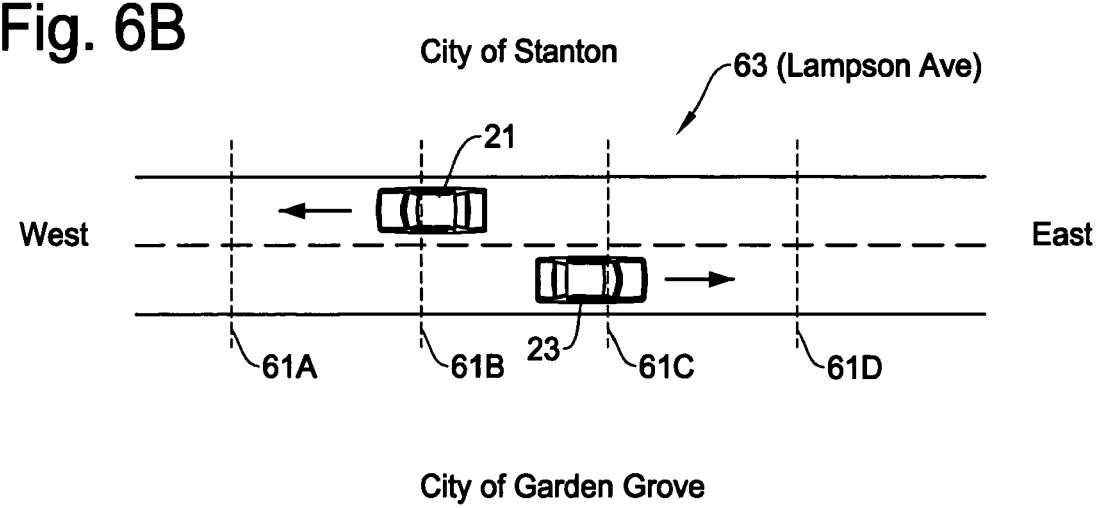

FIGS. 6A and 6B are schematic diagrams for explaining the basic concept of the present invention for determining a correct city name based on the traveling direction of the vehicle, i.e, the solution of the problems explained with reference to FIGS. 2A and 2B. FIG. 6A schematically shows a plurality of reference points associated with the street, and FIG. 6B shows an example of method for determining a traveling direction of the vehicle based on an order of passing the reference points. In the example of FIGS. 6A and 6B, on a street 63, a plurality of reference points 61A, 61B, 61C, and 61D are specified which may be node data of street available from the map data. By examining the manner of passage at the reference points by the vehicle, as to which one comes after the other one, the navigation system can determine the direction of vehicle that is running on the street 63.

For instance, if the vehicle 23 in FIG. 6B passes the reference point 61B and then the reference 61C, it can be determined that the vehicle 23 is moving from the west to the east. Likewise, if the vehicle 21 in FIG. 6B passes the reference point 61C and then the reference point 61B, it can be determined that the vehicle 21 is moving from the east to the west. In other words, by checking the order of the reference points encountered by the vehicle, the navigation system determines the direction of vehicle that is running on the street 63.

Since the direction of the vehicle shows which side of the street the vehicle is running, the navigation system determines the correct city name based on the side of the street. For example, in FIG. 6B, since the vehicle 21 is running toward the west, it is on the north side of the border street 63, thus the correct city name is "Stanton" at the north of the border street 63. In contrast, since the vehicle 23 is running toward the east, it is on the south side of the border street 63, thus the correct city name is "Garden Grove" at the south of the border street 63.

In addition to the node data noted above, the reference points may be other map data indicating house (address) numbers, POI locations, etc. The reference points may also be dynamically created by the navigation system on the border street by, for example, interpolating two known absolute positions on the border street. The direction of the vehicle may also be determined by comparing the current location and previous location based on GPS signals, checking an angle of the movement detected by a gyroscope mounted on the vehicle, etc.

Figure 3A:
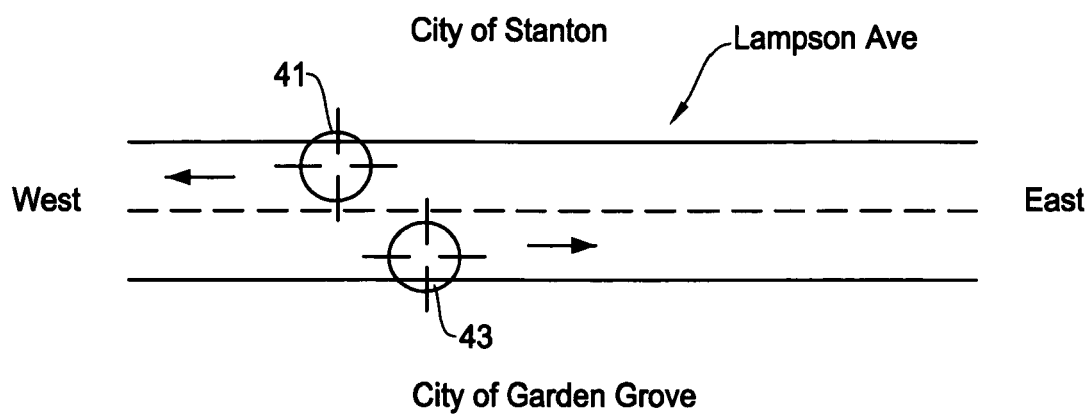
FIGS. 3A and 3B are schematic diagrams for explaining another problem associated with the conventional navigation system when a street is on a border of adjacent cities where
Figure 3B:
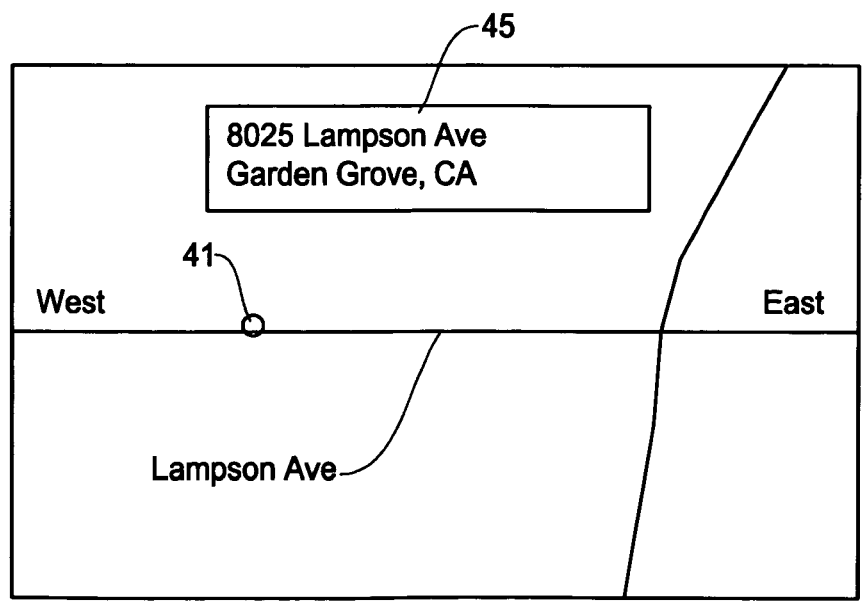
Figure 7A:
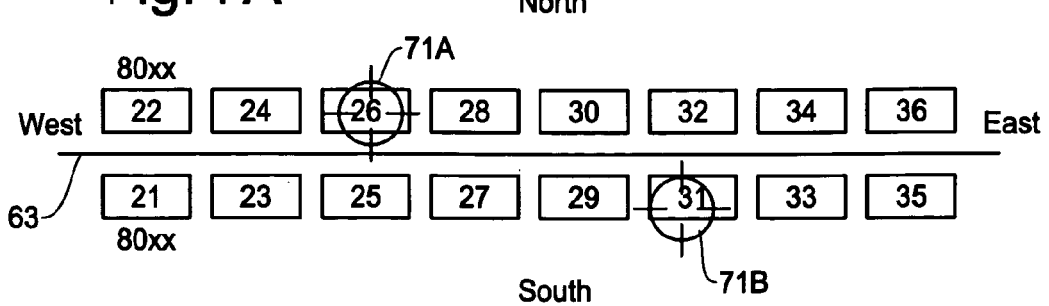
FIGS. 7A-7C are schematic diagrams for correctly determining a city name appropriate to the cursor point on the map image in the present invention when the street is on the border of adjacent cities where
Figure 7B:
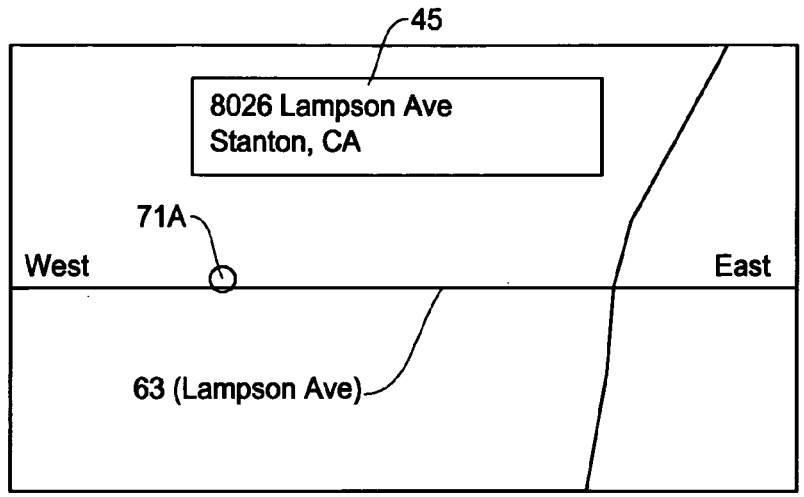
Figure 7C:
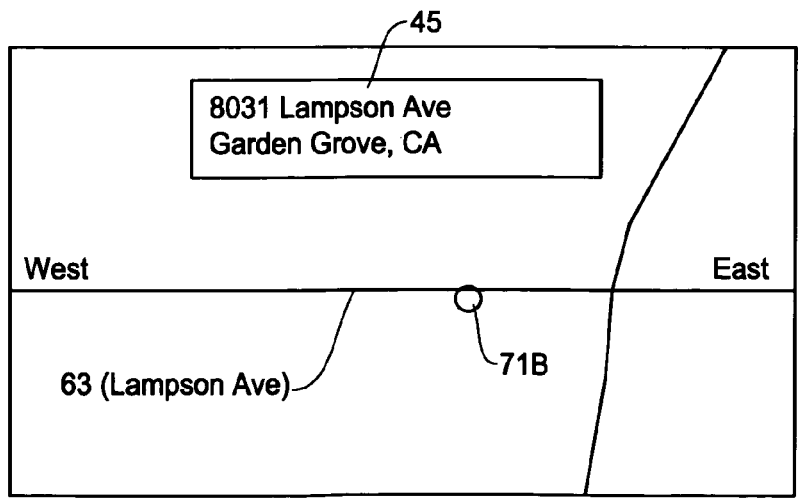

FIGS. 7A-7C are schematic diagrams for correctly determining a city name appropriate to the cursor point on the map image in the present invention when the street is on the border of adjacent cities, i.e., the solution of the problems explained with reference to FIGS. 3A and 3B. FIG. 7A shows the map data associated with the cursor points on the street which include house (address) numbers and their locations. FIG. 7B is an example of schematic representation on the navigation screen when the cursor point is at the north side of the border street. FIG. 7C is an example of schematic representation on the navigation screen when the cursor point is at the south side of the border street.

In the example of FIG. 7A, the map data with respect to the border street 63 that runs in an east/west direction may be configured by the border information (center line). Thus, when the user operates the cursor on the map image such as positions (cursor points) 71A or 71B, the navigation system is able to determine whether the cursor position is on the north side or south side of the border street 63. Based on this determination, the navigation system is able to display the address with the correct city name.

FIGS. 7A and 7B are directed to the same situation of FIGS. 2A-4b and 6A-6B where the border street 63 "Lampson Ave" borders the two cities "Stanton" and "Garden Grove". As shown in FIG. 7B, if the cursor position 71A is at the north side of the street 63, the navigation system displays the address of the cursor point that includes the city "Stanton" in the address window 45. If the cursor position 71B is at the south side of the street 63, the navigation system displays the address of the cursor point that includes the city "Garden Grove" in the address window 45 as shown in FIG. 7B.

Typically, the map data also include information on the address (house) numbers along the street where such address numbers are assigned according to a predetermined regulations. In the example of FIG. 7A, the even address numbers are located along the north side of the border street 63 and the odd address numbers are located along the south side of the border street 63. This arrangement of the address numbers can be used to determine the correct city name based on which address number is most proximate to the cursor point.

As noted above, FIGS. 7A and 7B are directed to the same situation where the street 63 "Lampson Ave" borders the two cities "Stanton" and "Garden Grove". Thus, as shown in FIG. 7B, if the cursor position 71A is most proximate to the address number "8026", an even number, the navigation system determines that the cursor point is at the north side of the street 63 and displays the address of the cursor point that includes the city "Stanton" and the address number "8026". Similarly, if the cursor position 71B is most proximate to the address number "8031", an odd number, the navigation system determines that the cursor point is in the south side of the street and displays the address of the cursor point that includes the city "Garden Grove" and address number "8031" as shown in FIG. 7C.

FIGS. 8A-8D are schematic diagrams for correctly determining a city name appropriate to the address number in the present invention when the street is on a border of adjacent cities. Thus, FIGS. 8A-8B show the solution of the problems explained with reference to FIGS. 4A and 4B involving the process of inputting an address number associated with a border street. In the present invention, the navigation system determines the side of the street based on the address number with reference to the map data such as shown in FIG. 7A.

FIG. 8A shows a navigation screen for selecting a destination by inputting an address thereof where an odd address number is specified in an address input field 53, which also shows a key pad 55 and a street name "Lampson". As soon as the address number "8035" is specified, the navigation system displays a city name "Garden Grove" in a city name list 57 as shown in FIG. 8B. Since the address number is an odd number in this case, i.e., the south side of the border street "Lampson", there is only one city that is appropriate under the circumstances (FIGS. 6A-6B and 7A-7C) which is "Garden Grove".

FIG. 8C shows a navigation screen for selecting a destination by inputting an address thereof where an even address number is specified in the address input field 53, which also shows the key pad 55 and the street name "Lampson". As soon as the address number "8036" is specified, the navigation system displays a city name "Stanton" in a city name list 57 as shown in FIG. 8D. Since the address number is an even number in this case, i.e., the north side of the border street "Lampson", there is only one city that is appropriate for the address "3036 Lampson" which is the city of "Stanton".

Figure 9:
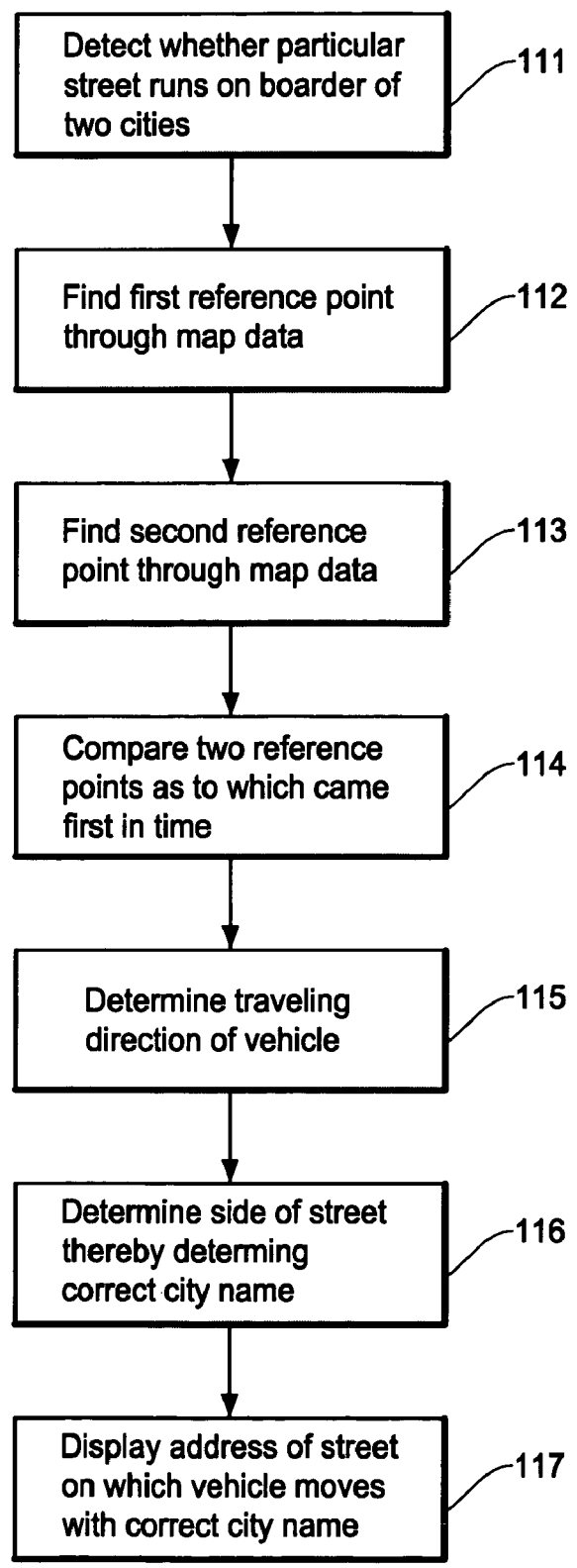
FIG. 9 is a flowchart showing an example of operational process of the present invention for determining a traveling direction of the vehicle by examining the reference points, thereby determining a correct city name.

FIG. 9 is a flowchart showing an example of operational process of the present invention for determining a traveling direction of the vehicle by examining the reference points, thereby determining a correct city name. In the first step 111, the navigation system determines whether a particular street on which the vehicle is currently running is on a border between two or more cities, towns, counties, states, etc. (border street). If the street is a border street, the navigation system detects the first reference point on the border street in the step 112.

In the step 113, the navigation system detects the second reference point on the border street through the map data. As noted above with reference to FIGS. 6A and 6B, such first and second reference points can be position data of the nodes of the border street available from the map data. In the step 114, the navigation system compares the passage or timing of the reference points by the vehicle, as to which one comes after the other one.

Thus, in the step 115, the navigation system determines the travel direction of vehicle that is running on the border street. Since the direction of the vehicle defines which side of the street the vehicle is running, in the step 116, the navigation system determines the side (ex. north, south, etc.) of the border street at which the vehicle is located. Finally, in the step 117, the navigation system displays the address information on the border street with the city name corresponding to the side of the street.

Namely, since the direction of the vehicle shows which side of the street the vehicle is running, the navigation system determines the correct city name based on the side of the street. Thus, in the example of FIG. 6B, since the vehicle 21 is running toward the west, the vehicle is on the north side of the border street 63, thus the correct city name "Stanton" at the north side of the border street 63 will be displayed. In contrast, since the vehicle 23 is running toward the east, the vehicle is on the south side of the border street 63, thus the correct city name "Garden Grove" at the south side will be displayed.

Figure 10:
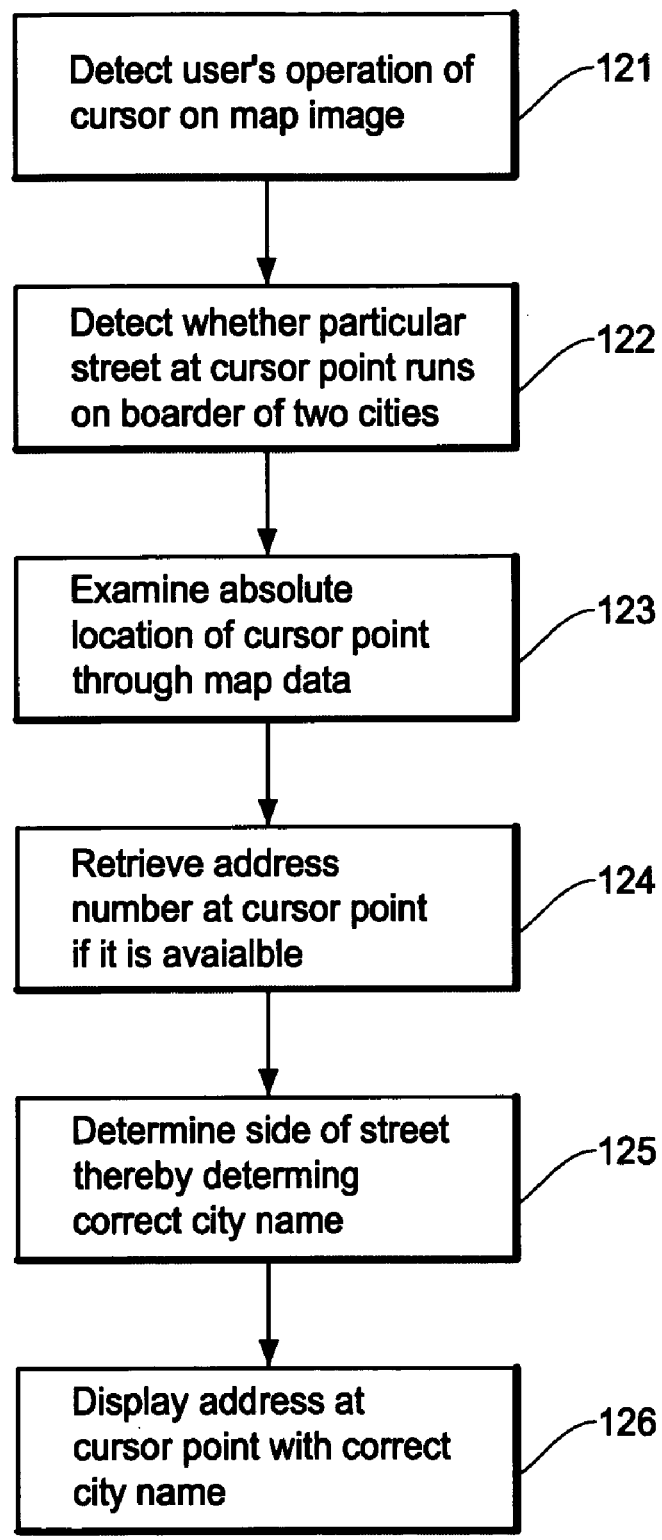
FIG. 10 is a flowchart showing an example of operational process of the present invention for determining a side of the street that is specified by the cursor point on the map image, thereby determining a correct city name.

FIG. 10 is a flowchart showing an example of operational process of the present invention for determining a side of the street that is specified by the cursor point on the map image, thereby determining a correct city name. In the first step 121, the navigation system detects whether the user operates the cursor on the map image of the navigation screen. Then, the navigation system determines whether a particular street at a cursor point is on a border between two or more cities, towns, counties, states, etc. (border street) in the step 122.

If the particular street is a border street, in the step 123, the navigation system examines the absolute location of the cursor point through the map data. Typically, the map data of the navigation system include the information associated with the street specified by the cursor point which include house (address) numbers and their locations as shown in FIG. 7A. In the step 124, the navigation system retrieves the address number at the cursor point when it is available.

In the step 125, the navigation system determines which side of the border street to which the cursor point is most proximate. This determination is made based on the absolute location of the cursor point on the map image detected in the step 123 or the address number at the cursor point, whether it is an odd number or an even number. In the example of FIG. 7A, the odd address numbers are assigned to the south side of the street while the even address numbers are assigned to the north side of the street. Finally, in the step 126, the navigation system displays the address information on the border street with the city name corresponding to the side of the border street.

Namely, the navigation system determines the correct city name based on the side of the border street by examining the absolute position of the cursor point or the address number proximate to the cursor point. Thus, in the example of FIG. 7B, since the cursor point 71A is more likely to be on the north side of the border street 63, the city name "Stanton" at the north side will be displayed. In contrast, in the example of FIG. 7C, since the cursor point 71B is more likely to be on the south side of the border street 63, the city name "Garden Grove" at the south side will be displayed.

Figure 11:
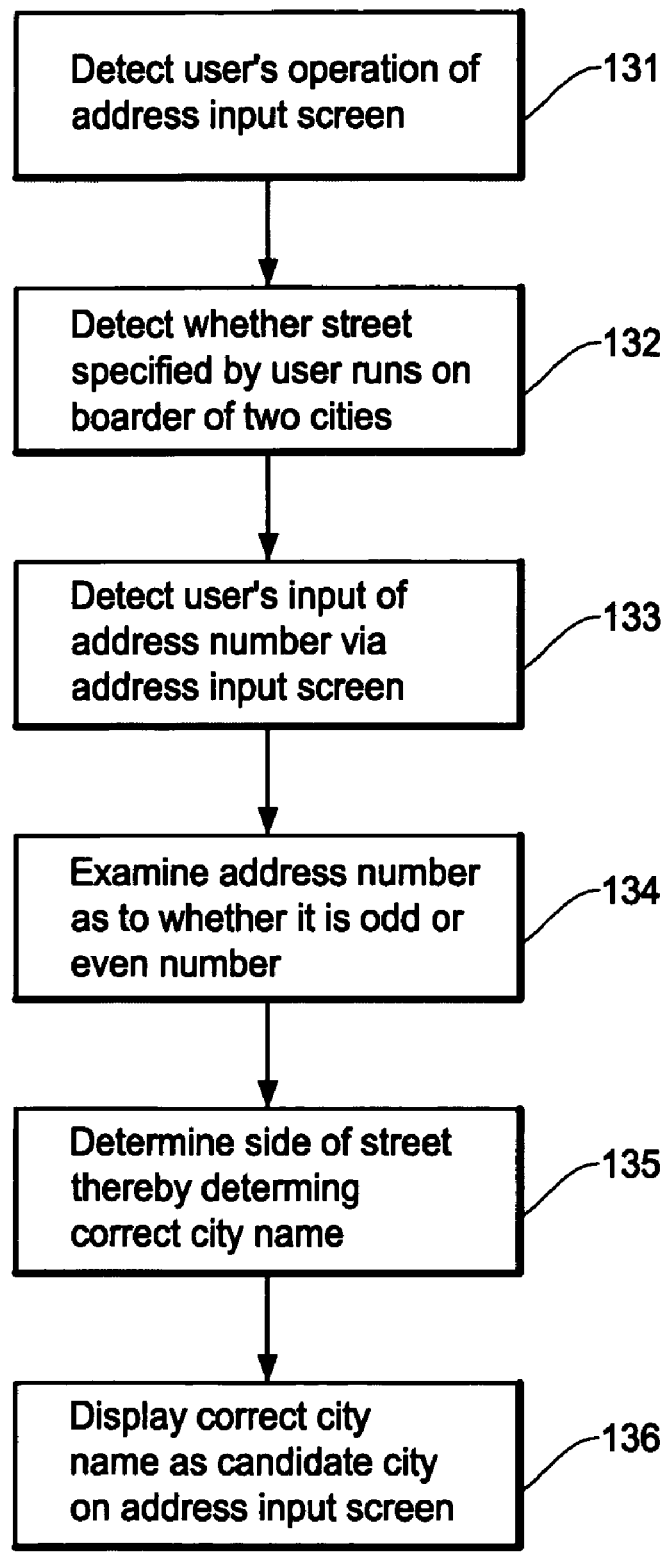
FIG. 11 is a flowchart showing an example of operational process of the present invention for determining a side of the street based on an address number specified by the user, thereby determining a correct city name.

FIG. 11 is a flowchart showing an example of operational process of the present invention for determining a side of the street based on an address number specified by the user, thereby determining a correct city name. In the first step 131, the navigation system detects whether the user operates address input screen by inputting characters in the address input field on the screen. Then, the navigation system determines whether a particular street specified by the user is on a border between two or more cities, towns, counties, states, etc. (border street) in the step 132.

If the particular street is a border street, in the step 133, the navigation system examines whether an address number is specified by the user in the address input filed on the screen. In the step 134, the navigation system examines the address number as to whether it is an odd number or an even number. In the step 135, the navigation system determines to which side of the border street the specified address number is assigned.

This determination is made based on the map data since odd numbers and even numbers are assigned to a street according to prescribed regulations. In the example of FIG. 7A, the odd address numbers are assigned to the south side of the street while the even address numbers are assigned to the north side of the street. Finally, in the step 136, the navigation system displays the address information on the border street with the city name corresponding to the side of the street.

Namely, the navigation system determines the correct city name based on the side of the street by examining the address number specified by the user on the address input screen. Thus, in the example of FIGS. 8A and 8B, since the address number is odd number which is on the south side of the border street 63, the city name "Garden Grove" at the south will be displayed. In contrast, in the example of FIGS. 8C and 8D, since the address number is an even number which is on the north side of the border street 63, the city name "Stanton" at the north side will be displayed.

Figure 12:
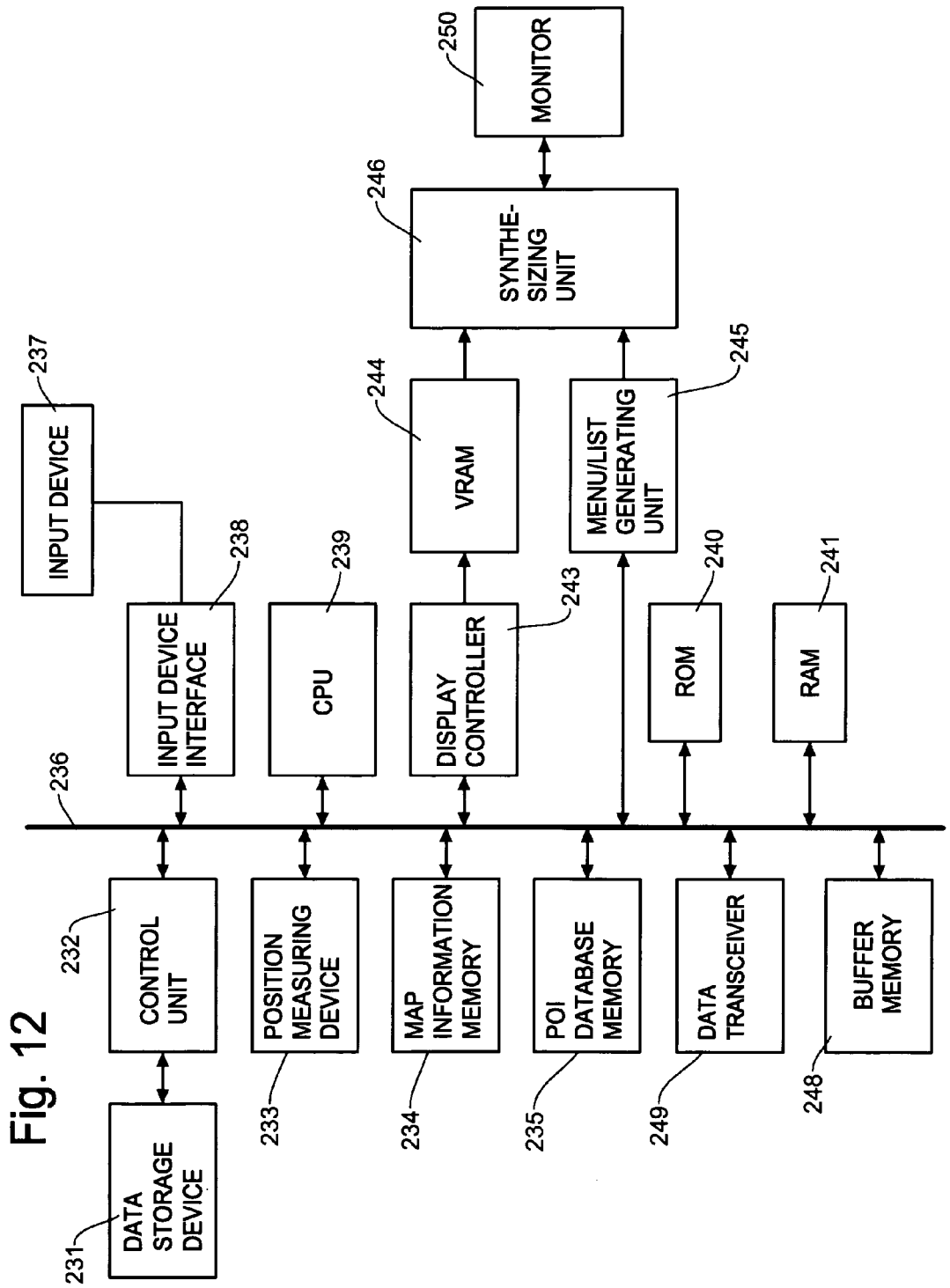
FIG. 12 is a functional block diagram showing an example of structure of a vehicle navigation system implementing the method of the present invention for determining a correct city name.

FIG. 12 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage device 231 such as a hard disc, CD-ROM, DVD, memory device or other storage means (hereafter "data storage") for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction or angle, a microprocessor for calculating a position, a GPS (global positioning system) receiver for receiving GPS signals from satellites, and etc.

The block diagram of FIG. 12 further includes a map information memory 234 for storing the map information which is read from data storage device 231, a database memory 235 for storing database information such as point of interest (POI) information which is read out from the data storage device 231, an input device 237 for executing a menu selection operation, an enlarge/reduce operation, a destination input operation, etc. and an input device interface 238.

The input device 237 can be a touch screen, a physical buttons, a remote controller, voice recognition input, or any other input device.

In FIG. 12, the navigation system further includes a bus 236 for interfacing the above units in the system, a processor (CPU) 239 for controlling an overall operation of the navigation system, a ROM 240 for storing various control programs such as a route search program, a map matching program necessary for navigation control, and a program for implementing the present invention, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a data transceiver 249 for wireless communication to retrieve data from a remote server, a buffer memory 248 for temporarily storing data for ease of data processing, and a monitor (display) 250.

The procedures described in the flow charts in FIGS. 5 and 9-11 is performed by the CPU 239 based on the program stored in, for example, the ROM 240. Namely, the CPU 239 controls the overall operation of the method of the present invention and establishes all of the functional means of the apparatus of the present invention in combination with other components such as the data storage device 231, position measuring device 233, input device 237, and monitor 250, etc. The data for reference points such as shown in FIGS. 6A and 6B may be stored in the data storage device 231, or it may be dynamically created by the CPU 239. The street link data stored in the data storage device 231 may have a plurality of associated cities that have a common border street to be used for the present invention.

As has been described above, according to the present invention, the navigation system enables to identify a correct city name based on various determination factors when a particular street is located on a border of two or more cities. The method and apparatus of the present invention is able to identify a correct city name associated with such a border street based on a direction of vehicle travelling on the border street. The method and apparatus of the present invention is able to identify a correct city name associated with such a border street based on a cursor point on the map image as to which side of the street is more proximate to the cursor point. The method and apparatus of the present invention is able to identify a correct city name associated with such a border street based on an address number specified by the user as to whether the address number is an odd number or even number thereby determining the side of the street. As a consequence, the user is able to see a more appropriate city name when the user is driving on the border street, pointing a cursor on the border street, or inputting address data associated with the border street through the navigation screen, etc.

Although the invention is described herein with reference to the preferred embodiments, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for determining a correct city name for a navigation system, comprising the following steps of:
   specifying a street by a user;
   determining, via a processor, whether the specified street is a border street that runs along a border between two or more cities;
   selecting and applying a determination factor appropriate to a current situation associated with the border street;
   determining and selecting a city name associated with the border street appropriate to the current situation; and
   displaying the selected city name as a part of address information associated with the border street on a screen of the navigation system;
   wherein the city represents a unit of any administrative region including town, county and state.

2. A method for determining a correct city name as defined in claim 1, wherein said step of determining and selecting the city name includes a step of selecting the city name that is located at a side of the border street by applying the determination factor.

3. A method for determining a correct city name as defined in claim 2, wherein said step of determining whether the specified street is a border street includes a step of evaluating map data stored in the data storage medium of the navigation system and retrieving information related to the border street and names of two or more associated cities.

4. A method for determining a correct city name as defined in claim 2, wherein said border street is specified by the user when a vehicle of the user is travelling on the border street which is detected by the navigation system based on GPS signals.

5. A method for determining a correct city name as defined in claim 2, wherein said border street is specified by the user when the user operates a cursor on a map image on the screen of the navigation system where the cursor on map image points to the border street.

6. A method for determining a correct city name as defined in claim 2, wherein said border street is specified by the user when the user operates an address input screen of the navigation system where the user inputs a name of the border street.

7. A method for determining a correct city name as defined in claim 4, wherein said determination factor is a travelling direction of the vehicle that runs on the border street to determine the side of the border street on which the vehicle is traveling.

8. A method for determining a correct city name as defined in claim 5, wherein said determination factor is an exact location of the cursor point on the map image to determine the side of the border street at which the cursor point is located.

9. A method for determining a correct city name as defined in claim 5, wherein said determination factor is an address number corresponding to the cursor point on the map image to determine the side of the border street at which the cursor point is located.

10. A method for determining a correct city name as defined in claim 6, wherein said determination factor is an address number specified by the user as to whether it is an odd number or an even number to determine the side of the border street at which the address number is located.

11. An apparatus for determining a correct city name for a navigation system, comprising:
    means for specifying a street by a user;
    means for determining whether the specified street is a border street that runs along a border between two or more cities;
    means for selecting and applying a determination factor appropriate to a current situation associated with the border street;

means for determining and selecting a city name associated with the border street appropriate to the current situation; and means for displaying the selected city name as a part of address information associated with the border street on a screen of the navigation system;

wherein the city represents a unit of any administrative region including town, county and state.

12. An apparatus for determining a correct city name as defined in claim 11, wherein said means for determining and selecting the city name includes means for selecting the city name that is located at a side of the border street by applying the determination factor.

13. An apparatus for determining a correct city name as defined in claim 12, wherein said means for determining whether the specified street is a border street includes means for evaluating map data stored in the data storage medium of the navigation system and retrieving information related to the border street and names of two or more associated cities.

14. An apparatus for determining a correct city name as defined in claim 12, wherein said border street is specified by the user when a vehicle of the user is travelling on the border street which is detected by the navigation system based on GPS signals.

15. An apparatus for determining a correct city name as defined in claim 12, wherein said border street is specified by the user when the user operates a cursor on a map image on the screen of the navigation system where the cursor on the map image points to the border street.

16. An apparatus for determining a correct city name as defined in claim 12, wherein said border street is specified by the user when the user operates an address input screen of the navigation system where the user inputs a name of the border street.

17. An apparatus for determining a correct city name as defined in claim 14, wherein said determination factor is a travelling direction of the vehicle that runs on the border street to determine the side of the border street on which the vehicle is traveling.

18. An apparatus for determining a correct city name as defined in claim 15, wherein said determination factor is an exact location of the cursor point on the map image to determine the side of the border street at which the cursor point is located.

19. An apparatus for determining a correct city name as defined in claim 15, wherein said determination factor is an address number corresponding to the cursor point on the map image to determine the side of the border street at which the cursor point is located.

20. An apparatus for determining a correct city name as defined in claim 16, wherein said determination factor is an address number specified by the user as to whether it is an odd number or an even number to determine the side of the border street at which the address number is located.

* * * * *